US012631292B2

(12) United States Patent
Herd

(10) Patent No.: US 12,631,292 B2
(45) Date of Patent: May 19, 2026

(54) VALVE FOR SUPPLYING AND PURGING LUBRICANTS FROM SYSTEMS

(71) Applicant: Caterpillar SARL, Geneva (CH)

(72) Inventor: Stephen Dale Herd, Durham (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/862,835

(22) PCT Filed: Apr. 28, 2023

(86) PCT No.: PCT/EP2023/025195
§ 371 (c)(1),
(2) Date: Nov. 4, 2024

(87) PCT Pub. No.: WO2023/213429
PCT Pub. Date: Nov. 9, 2023

(65) Prior Publication Data
US 2025/0277560 A1 Sep. 4, 2025

(30) Foreign Application Priority Data

May 5, 2022 (GB) ..................................... 2206562

(51) Int. Cl.
F16N 11/04 (2006.01)
F16N 31/00 (2006.01)
(52) U.S. Cl.
CPC .............. F16N 11/04 (2013.01); F16N 31/00 (2013.01)
(58) Field of Classification Search
CPC ...................................................... F16N 11/04

USPC ......................................................... 251/227
See application file for complete search history.

(56) References Cited

U.S. PATENT DOCUMENTS

| | | | |
|---|---|---|---|
| 4,187,682 A | * | 2/1980 | Shen .......................... F15B 1/08 |
| | | | 60/413 |
| 5,658,053 A | | 8/1997 | Vencill et al. |
| 6,244,389 B1 | | 6/2001 | Wilcox |
| (Continued) | | | |

FOREIGN PATENT DOCUMENTS

| | | | |
|---|---|---|---|
| CN | 202281023 | * | 6/2012 |
| CN | 202281023 U | | 6/2012 |
| (Continued) | | | |

OTHER PUBLICATIONS

International Search Report related to Application No. PCT/EP2023/025195; reported on Aug. 14, 2023.
(Continued)

*Primary Examiner* — Victoria P Augustine
*Assistant Examiner* — Mark K Buse

(57) ABSTRACT

A valve includes a housing and a plunger. The housing defines a chamber, a set of ports, and a set of conduits. The plunger is disposed within the chamber and is configured to be moved to an actuated state in which the set of ports are fluidly coupled to each other through a first section of the chamber to define a first passageway and the set of conduits are fluidly coupled to each other through a second section of the chamber to define a second passageway. In the actuated state, the valve facilitates an inflow of a lubricant into a system through the first passageway to cause a concomitant purge and release of a used lubricant from the system through the second passageway.

9 Claims, 5 Drawing Sheets

(56)         References Cited

U.S. PATENT DOCUMENTS

| | | | | |
|---|---|---|---|---|
| 6,267,147 B1 * | 7/2001 | Rago | .......................... | F15B 1/24 |
| | | | | 138/30 |
| 8,556,038 B2 * | 10/2013 | Kimura | ................. | F16D 25/123 |
| | | | | 184/6 |
| 9,097,385 B2 | 8/2015 | Gurney et al. | | |
| 11,435,028 B2 * | 9/2022 | Conley | ................... | F16N 13/16 |

FOREIGN PATENT DOCUMENTS

| | | | |
|---|---|---|---|
| CN | 203836552 U | 9/2014 |
| EP | 0715118 A1 | 6/1996 |
| WO | 2010040027 A2 | 4/2010 |
| WO | 2015180638 A1 | 12/2015 |

OTHER PUBLICATIONS

Great Britain Search Report related to Application No. 2206562.7; reported on Nov. 4, 2022.

* cited by examiner

VALVE FOR SUPPLYING AND PURGING LUBRICANTS FROM SYSTEMS

CROSS-REFERENCE TO RELATED APPLICATION

This Application is a 35 USC § 371 US National Stage filing of International Application No. PCT/EP2023/025195 filed on Apr. 28, 2023 which claims priority under the Great Britain Patent Application No. 2206562.7 filed on May 5, 2022.

TECHNICAL FIELD

The present disclosure relates to a valve for facilitating lubricant transfer with respect to a system. More particularly, the present disclosure relates to a valve for supplying a new lubricant to a system and, in process, purging a used lubricant from the system.

BACKGROUND

Applications, such as, mining, earth moving, and construction, typically involve the use of machines, such as excavators, shovels, loaders, articulated trucks, and the like, to carry out one or more tasks at a worksite. Such machines generally include systems in which components interact and/or move with respect to one another so that they can perform their intended function(s) effectively. As an example, articulation systems in hitch systems of an articulated truck includes a myriad of components that are configured to interact and/or move with respect to one other to facilitate a turning of a forward portion of a frame of the articulated truck with respect to the rearward portion of the frame of the articulated truck, during machine travel.

Generally, such components in such systems are supplied with one or more lubricants (e.g., grease) so that they can interact and/or move with respect to each other with relative ease. However, after a period of use, such lubricants may deteriorate in quality and/or lose one or more of their properties (e.g., viscosity), and may accordingly need a replacement. Replacing a lubricant (e.g., a used lubricant) or a lubricant replacement procedure generally involves discarding a used lubricant from the system and replenishing the system with a new lubricant. An improperly discarded lubricant may contaminate the environment. Moreover, if the system to be replaced with the new lubricant is a sealed system (e.g., sealed to prevent the components and/or the lubricant running therein from external contamination), a difficulty associated with the lubricant replacement procedure is generally further compounded.

SUMMARY

In one aspect, the disclosure is directed to a valve. The valve includes a housing and a plunger. The housing defines a chamber, a set of ports, and a set of conduits. The plunger is disposed within the chamber and is configured to be moved to an actuated state in which the set of ports are fluidly coupled to each other through a first section of the chamber to define a first passageway and the set of conduits are fluidly coupled to each other through a second section of the chamber to define a second passageway. In the actuated state, the valve facilitates an inflow of a lubricant into a system through the first passageway to cause a concomitant purge and release of a used lubricant from the system through the second passageway.

In another aspect, the disclosure relates to a method for replenishing a lubricant in a system. The method includes providing a valve. The valve includes a housing and a plunger. The housing defines a chamber, a set of ports, and a set of conduits. The plunger is disposed within the chamber and is configured to be moved to an actuated state in which the set of ports are fluidly coupled to each other through a first section of the chamber to define a first passageway and the set of conduits are fluidly coupled to each other through a second section of the chamber to define a second passageway. The method further includes fluidly coupling the first passageway to a lubricant supply line to supply lubricant to the system and fluidly coupling the second passageway to a lubricant release line to release lubricant from the system. In the actuated state, the valve facilitates an inflow of a lubricant into the system through the first passageway to cause a concomitant purge and release of a used lubricant from the system through the second passageway.

Machines, such as excavators, shovels, loaders, articulated trucks, and the like, generally include systems to carry out one or more tasks. Such systems include multiple components that interact and/or move with respect to one another so that they can perform their intended function(s) effectively, and thus, such systems need to be properly lubricated and/or greased. A lubricant (e.g., grease) applied in such systems may be replaced after a period of use. If a good seal exists in such systems, it is generally difficult to replenish the system with a new lubricant and purge the system of an old lubricant. Moreover, an improper purging of a used lubricant may also contaminate the environment.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
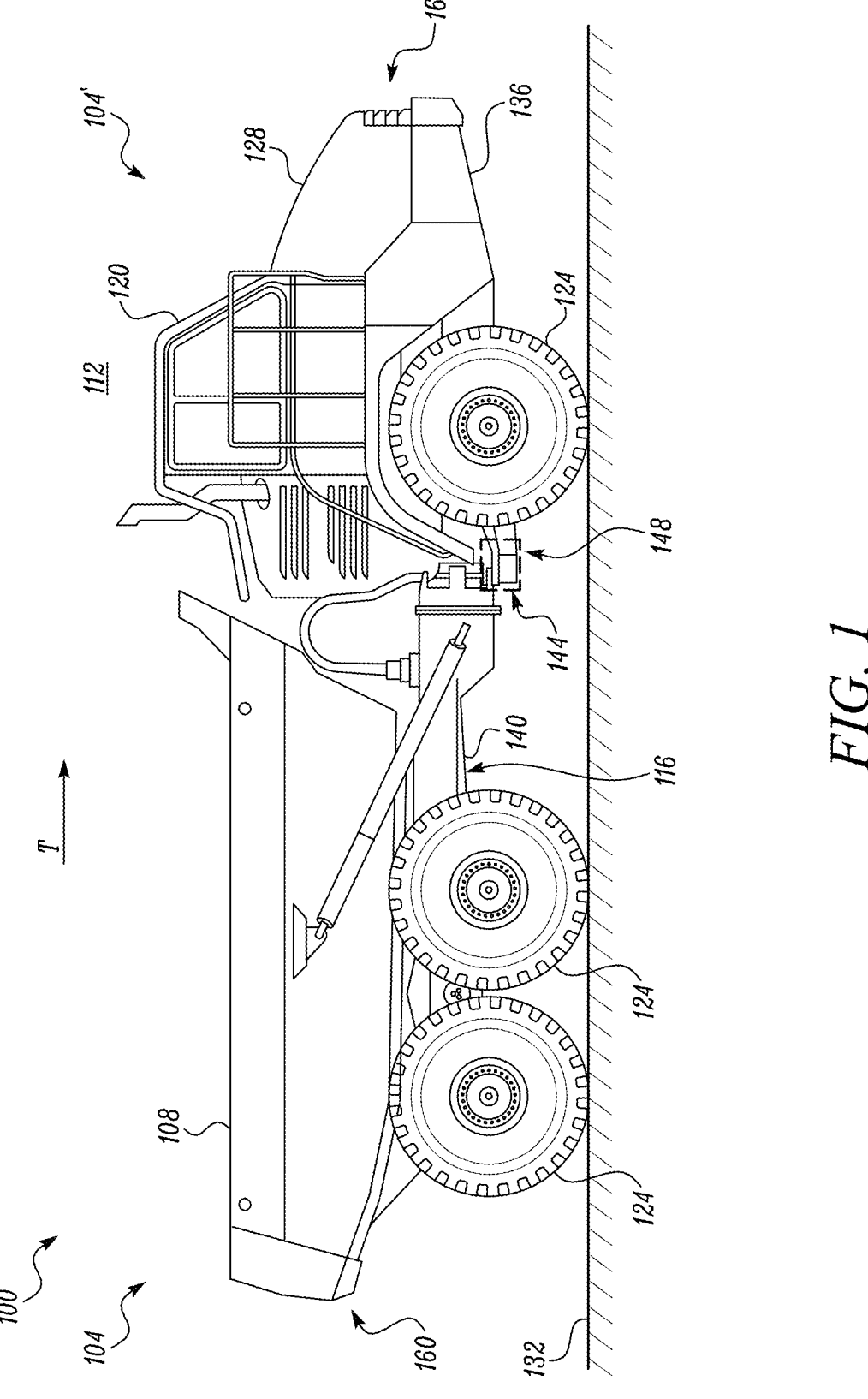
FIG. 1 is a side view of an exemplary machine having a forward frame portion, a rearward frame portion, and a hitch system that pivotally couples the forward frame portion to the rearward frame portion, in accordance with an embodiment of the present disclosure.

Referring to FIG. 1, an exemplary machine (i.e., machine 100) is shown. The machine 100 may include an articulated machine 104 (e.g., an articulated dump truck 104') having a dump body 108 within which a payload (not shown) may be received. The payload may be transferred or hauled from one location to another location at a worksite 112 by the machine 100. The payload may include, but not limited to, rocks, ores, minerals, and/or other disintegrated particles generally found at a worksite. Examples of the worksite 112 may include a construction site, a mine site, a landfill, a quarry, an underground mine site, and the like. Further, locations of the worksite 112 between which the machine 100 may traverse back and forth during operations may include one or more load locations (not shown) from where the machine 100 may receive the material, and one or more dump locations (not shown) up to where the machine 100 may traverse to so as to dump or release the material from the dump body 108.

The machine 100 may include a frame 116, an operator cab 120, and one or more traction devices 124 supported on the frame 116. The machine 100 may also include several other parts and sub-systems, such as a power compartment 128 that may house a power source (e.g., an internal combustion engine) (not shown) for powering several functions of the machine 100, including, but not limited to, providing power to the traction devices 124 such that the machine 100 may be propelled or moved over a ground surface 132 of the worksite 112. The traction devices 124 may include wheels or endless crawler tracks, or a combination thereof.

The frame 116 may include a rigid structure to which several other components (and/or sub-components) of the machine 100 may be coupled to. If the machine 100 were to include the articulated machine 104, such as the articulated dump truck 104', the frame 116 may include a split frame configuration that defines a forward frame portion 136 and a rearward frame portion 140. The forward frame portion 136 may be pivotably coupled to the rearward frame portion 140 by way of a hitch system 144 disposed at a hitch location 148 (also see FIG. 2). As an example, the hitch system 144 may be disposed in between the forward frame portion 136 and the rearward frame portion 140). By way of the hitch system 144, the forward frame portion 136 may pivot or articulate relative to the rearward frame portion 140, during machine movement, facilitating a steering of the machine 100 during machine movement.

Figure 2:
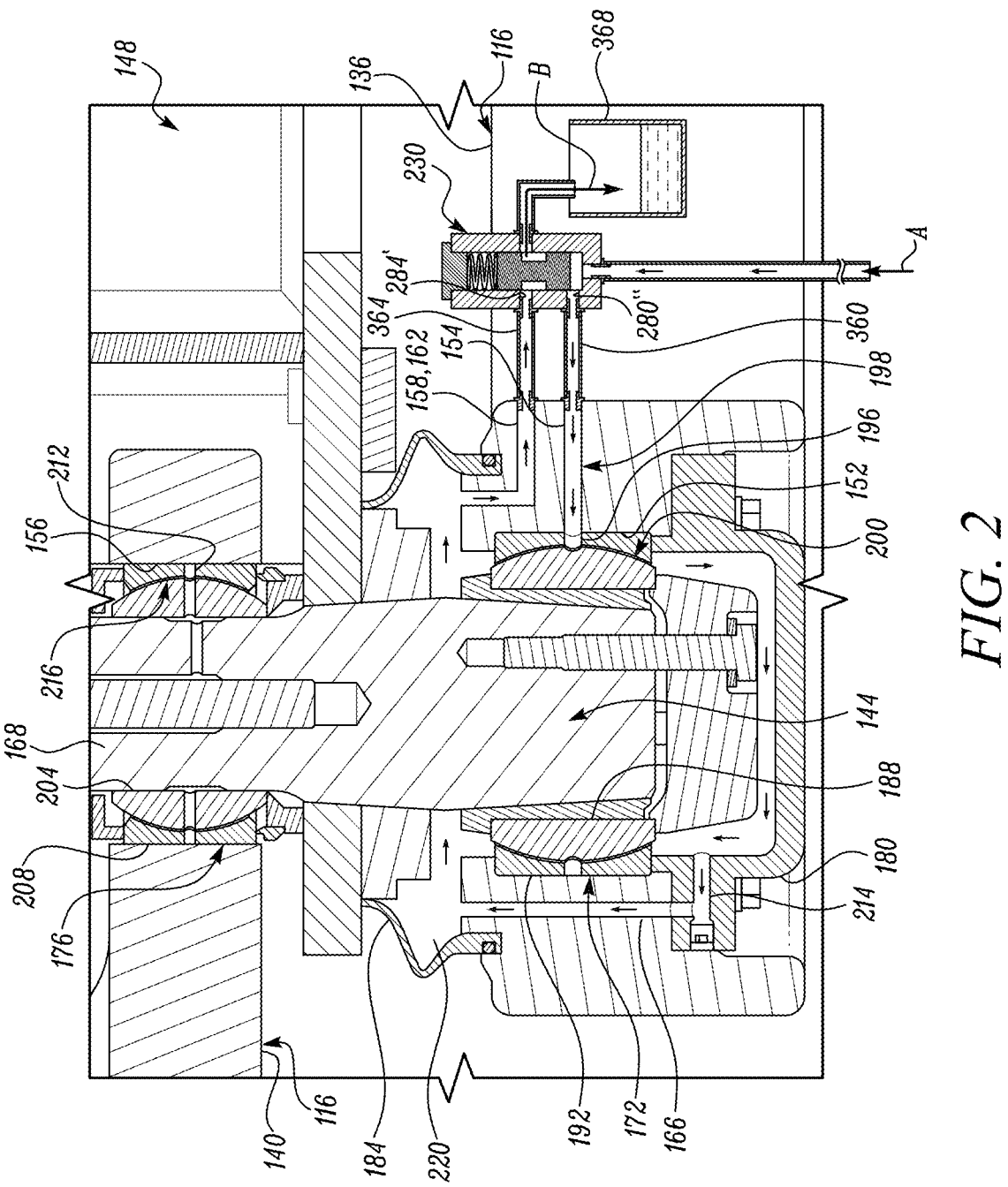
FIG. 2 is an enlarged view of the hitch system illustrated in conjunction with a valve that facilitates lubricant transfer with respect to the hitch system, in accordance with an embodiment of the present disclosure.

Referring to FIGS. 1 and 2, for enabling a pivotal coupling between the forward frame portion 136 and the rearward frame portion 140, portions of the hitch system 144 may be respectively accommodated within corresponding receiving portions or receptacles (e.g., a forward receptacle 152 and a rearward receptacle 156) respectively structured and arranged in the forward frame portion 136 and the rearward frame portion 140. Also, galleries, e.g., a first gallery 154 and a second gallery 158 may be defined in the forward frame portion 136. The first gallery 154 and the second gallery 158, when applied in concert or combination, may allow a lubricant transfer (e.g., a lubricant supply and a lubricant purge/release) to be carried out with respect to one or more components or sub-systems of the hitch system 144 such that a proper working of the hitch system 144 may be attained. As an example, the first gallery 154 may facilitate a lubricant supply into such systems and the second gallery 158 may facilitate a lubricant release or a lubricant purge from such systems. The forward frame portion 136 may also define a duct 166, as shown. Additional details related to each of the first gallery 154, second gallery 158, and the duct 166, shall be set out later in the present disclosure.

Further, and as an example, the forward frame portion 136 may support the operator cab 120 that, apart from housing various parts and systems, such as controls, etc., of the machine 100, may also accommodate/station one or more operators (not shown) of the machine 100 for the control of the many functions of the machine 100. The forward frame portion 136 may also support the power compartment 128 housing the power source (e.g., the internal combustion engine) that may power the traction devices 124 of the machine 100. The rearward frame portion 140 may support the dump body 108 of the machine 100.

During a straight line travel of the machine 100, the forward frame portion 136 may be aligned (i.e., to be in line) with respect to the rearward frame portion 140. However, during a movement of the machine 100 either towards a left of the machine 100 or towards a right of the machine 100, the forward frame portion 136 of the machine 100 may articulate or be pivoted relative to the rearward frame portion 140 of the machine 100, as facilitated by way of the hitch system 144.

It may be noted that the terms 'forward' and 'rearward', as used herein, are in relation to an exemplary direction of travel of the machine 100, as represented by arrow, T, in FIG. 1. Said direction of travel, T, may be the direction in which the machine 100 may generally travel so as to move or shuttle between a load location and a dump location of the worksite 112. Said direction of travel, T, may be exemplarily defined from a rearward end 160 of the machine 100 towards a forward end 164 of the machine 100. Also, the terms 'left' and 'right' as used in the present disclosure may be understood when viewing the machine 100 from the rearward end 160 towards the forward end 164.

One or more aspects of the present disclosure are discussed in connection with a system of the machine 100 that includes components interacting or moving with respect to one other, with such systems using lubricants, e.g., grease, so that they can uninterruptedly move with respect to one another to perform an intended task. As an example, said system includes or corresponds to the hitch system 144 and/or to one or more sub-systems of the hitch system 144. It is possible however for those aspects to be applied to multiple other systems or sub-systems of the machine 100. Moreover, it is also possible that aspects of the present disclosure be applicable to various systems of various other machines as well, such as excavators, loaders, graders, off-highway trucks, dozers, draglines, which use lubricants for a smooth and/or an uninterrupted interaction and/or movement between any two or more of their components.

Use of one or more aspects of the present disclosure also may be extended to systems applied in applications, such as marine applications, gas turbine applications, or to stationary machine applications (e.g., generator sets), and in which a set of components may require a lubricant (e.g., grease) such that they can smoothly interact and/or move with respect to each other. Effectively, references to the hitch system 144 and/or its sub-systems, and/or the machine 100 itself, as may be viewed and understood from the forthcoming disclosure below, are to be viewed as being purely exemplary.

The hitch system 144 includes a number of components that interact with each other to perform the intended function of facilitating and/or enabling the forward frame portion 136 to articulate or pivot with respect to the rearward frame portion 140. To this end, the hitch system 144 includes a hitch pin 168 and one or more sub-systems, such as a first bearing system 172 and a second bearing system 176. Further, the hitch system 144 may also include a lubricant case 180 and a seal 184. The hitch system 144 may include various other components, but for simplicity, they have not been discussed as they may be contemplated and applied by those with skill in the art.

The first bearing system 172 may include a first inner race 188 and a first outer race 192. The first inner race 188 and the first outer race 192 may be slidably disposed with respect to each other. As an example, the first outer race 192 may be fixedly retained (e.g., by press fitting and/or by bolting) against and/or into the forward receptacle 152 of the forward frame portion 136 such that the first outer race 192 may move along with a movement (e.g., rotary movement) of the forward frame portion 136 with respect to the first inner race 188 as the forward frame portion 136 moves (e.g., pivots or articulates) relative to the rearward frame portion 140. Further, and as an example, the first inner race 188 may be fixedly retained (e.g., by press fitting and/or bolting) with respect to a portion of the hitch pin 168.

The first outer race 192 may define a lubricant channel (e.g., a first lubricant channel 196) through which a lubricant (e.g., grease) may be introduced into an interface (e.g., a first interface 200) defined between the first inner race 188 and the first outer race 192. In so doing, a movement (e.g., a slidable and rotary movement) between the first inner race 188 and the first outer race 192 may be achieved with relative ease, and which in turn allows the forward frame portion 136 to move (e.g., pivot or articulate) relative to the hitch pin 168 (and thus relative to the rearward frame portion 140). In some embodiments, a lubricant, such as grease, may be supplied into the first lubricant channel 196 through the first gallery 154 of the forward frame portion 136. Combinedly, the first lubricant channel 196 and the first gallery 154 may function as a lubricant supply line 198 for supply of a lubricant (e.g., a new lubricant) to the first bearing system 172.

Similar to the configuration of the first bearing system 172, the second bearing system 176 may include a second inner race 204 and a second outer race 208. The second inner race 204 and the second outer race 208 may be slidably disposed with respect to each other. As an example, the second outer race 208 may be fixedly retained (e.g., by press fitting and/or by bolting) against and/or into the rearward receptacle 156 of the rearward frame portion 140 such that the second outer race 208 may move along with a movement (e.g., rotary movement) of the rearward frame portion 140 with respect to the second inner race 204 as the rearward frame portion 140 moves (e.g., pivots or articulates) relative to the forward frame portion 136. Further, and as an example, the second inner race 204 may be fixedly retained (e.g., by press fitting and/or bolting) to the hitch pin 168.

The second outer race 208 may also define a lubricant channel (e.g., a second lubricant channel 212) through which a lubricant (e.g., grease) may be introduced into an interface (e.g., second interface 216) defined between the second inner race 204 and the second outer race 208. In so doing, a movement (e.g., a slidable and rotary movement) between the second inner race 204 and the second outer race 208 may be achieved with relative ease, in turn allowing the rearward frame portion 140 to move (e.g., pivot or articulate) relative to the hitch pin 168 (and thus relative to the forward frame portion 136).

The lubricant case 180 may be configured to collect a volume of lubricant (e.g., new lubricant) exiting the interface (e.g., the first interface 200) defined between the first inner race 188 and the first outer race 192. The lubricant case 180 may be positioned under the first bearing system 172 and a collection of the lubricant (e.g., new lubricant) from the first interface 200 may be attained under the action of gravity or because of an inflow of the lubricant caused from a surplus lubricant pressure developed at the interface, e.g., during a replenishment (or a supply) of the lubricant (e.g., a new lubricant) at or into the first interface 200 through the first lubricant channel 196. Further, the lubricant case 180 may define an outlet 214 to direct a lubricant out from the lubricant case 180 into the duct 166 formed in the forward frame portion 136.

The seal 184 may be provided or disposed above the first bearing system 172, as shown. The seal 184 may function to shield the first bearing system 172 and the lubricant housed within or around the first bearing system 172 from an outside environment. The seal 184 may also contain or restrict the lubricant within a boundary defined by or around the first bearing system 172. The seal 184 may define an internal seal chamber 220 to accommodate the many components of the first bearing system 172, such as portions of the hitch pin 168, and to also receive a volume of lubricant flowing out from the lubricant case 180 through the duct 166.

Referring to FIGS. 2 to 5, a valve 230 for a facilitating a lubricant transfer with respect to the first bearing system 172 of the hitch system 144 is described. The expression 'lubricant transfer', as noted above or as used in the present disclosure, may mean or involve both a supply of a new lubricant into the first bearing system 172 or into the first interface 200 of the first bearing system 172 and a simultaneous or concomitant release or purge of a used lubricant from the first bearing system 172. In some embodiments, the lubricant transfer may correspond to a controlled lubricant transfer. In other words, the lubricant transfer may involve a metered supply of an amount of a new lubricant into the first bearing system 172 or the first interface 200 of the first bearing system 172 and an equitable release or purge of an amount of the used lubricant from the first bearing system 172 or the first interface 200 of the first bearing system 172 resulting from said metered supply of the new lubricant. The valve 230 includes a housing 234, a plunger 238, a biasing member 242, and a plug 246.

Figure 4:
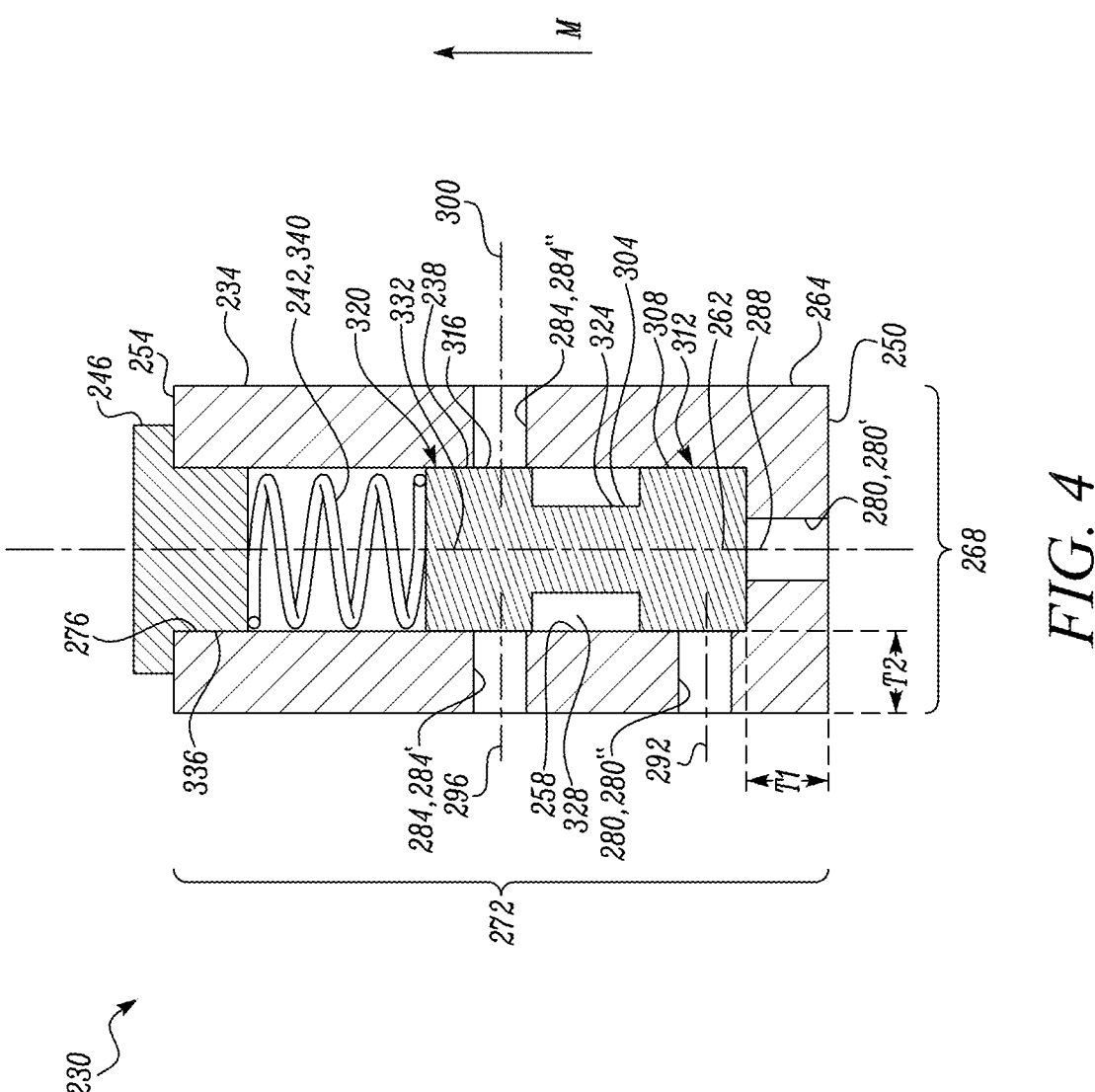
FIGS. 4 and 5 are various views illustrating different working or actuation states of the valve, in accordance with an embodiment of the present disclosure.
Figure 5:
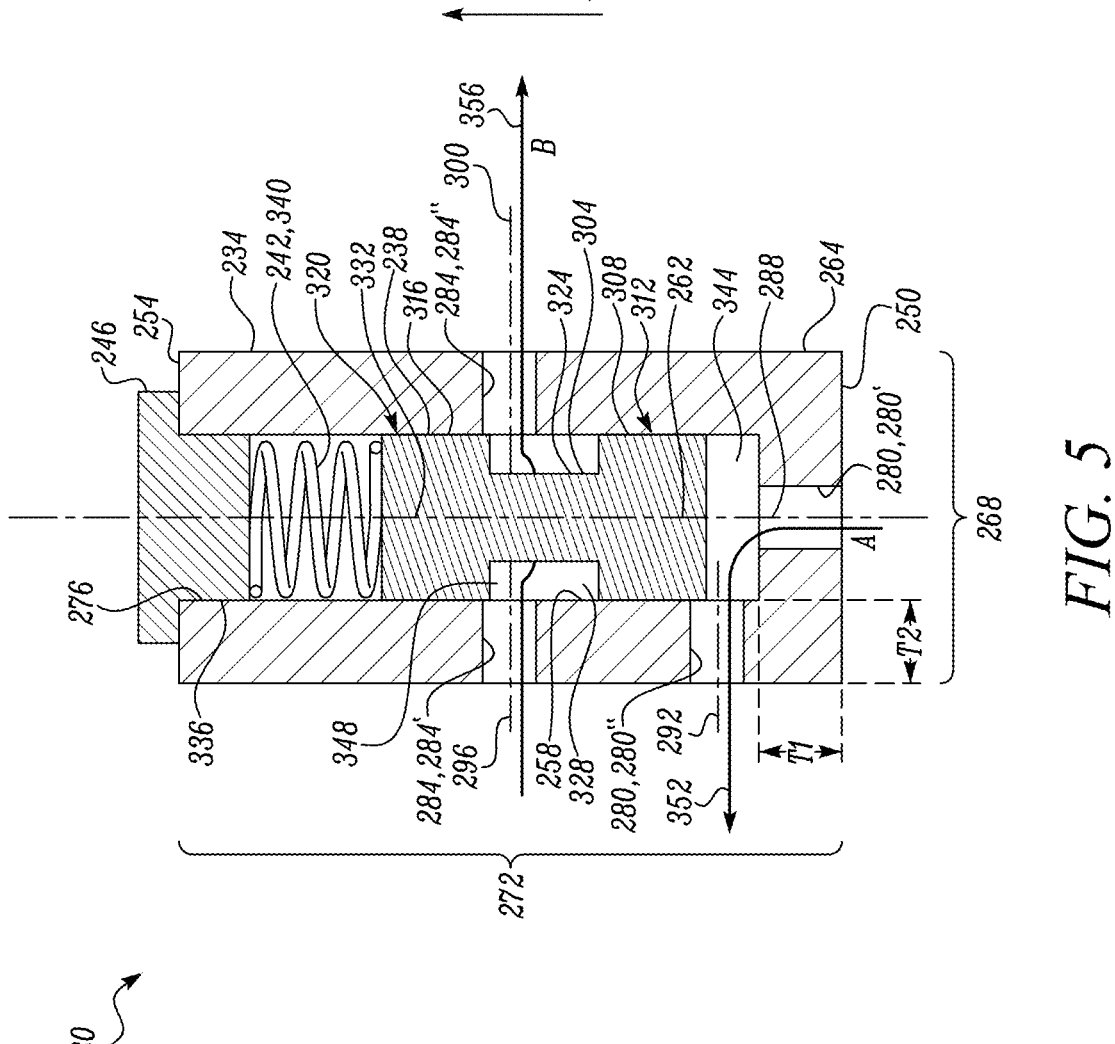

Referring to FIGS. 4 and 5, the housing 234 may include a generally elongated cylindrical structure defining a primary axial end 250 and a secondary axial end 254. The primary axial end 250 and the secondary axial end 254 may be disposed axially oppositely to each other. The housing 234 also defines a chamber 258 which may extend between the primary axial end 250 and the secondary axial end 254. The chamber 258 may impart a generally hollow cylindrical profile to the cylindrical structure of the housing 234. Other shapes or profiles of the housing 234 may be contemplated. Further, the chamber 258 may define a chamber axis 262 passing between and/or through the primary axial end 250 and the secondary axial end 254.

A wall 264 of the housing 234 may (at least partially) surround the chamber 258. As an example, a portion (e.g., a first portion 268) of the wall 264 may be present at the primary axial end 250 of the housing 234 to close the chamber 258 at the primary axial end 250 of the housing 234 while another portion (e.g., a second portion 272) of the wall 264 may be present annularly around the chamber 258 (e.g., which may run annularly around the chamber axis 262). A portion of the wall 264 may however be omitted at the secondary axial end 254 of the housing 234. In that manner, the chamber 258 may be generally closed or blind to the primary axial end 250 of the housing 234 and open to the secondary axial end 254 of the housing 234. Further, the chamber 258 may also define an opening 276 at the secondary axial end 254 for gaining access into the chamber 258 from the secondary axial end 254.

The housing 234 may also define a set of ports 280 and a set of conduits 284. The set of ports 280 may correspond to a first port 280' and a second port 280". A higher number of the set of ports 280 may be contemplated. As an example, the first port 280' may be formed or disposed at the primary axial end 250 of the housing 234 and may extend through a thickness, T1, of the first portion 268 of the wall 264 such that the first port 280' may facilitate fluid communication between the chamber 258 and an environment external to the housing 234. The first port 280' may define a first port axis 288, which may be co-axial or parallel to the chamber axis 262. The expression 'generally closed or blind', as used above, with respect to the chamber 258 means that the first port 280' may be closed to the chamber 258 in one or more working states of the valve 230.

As an example, the second port 280" may be formed or disposed on the second portion 272 of the wall 264 of the housing 234 and may extend through a thickness, T2, of the second portion 272 of the wall 264 such that the second port 280" may facilitate fluid communication between the chamber 258 and the environment external to the housing 234. The second port 280" may define a second port axis 292. In some embodiments, the second port axis 292 may be disposed orthogonally to the first port axis 288.

The set of conduits 284 may correspond to a first conduit 284' and a second conduit 284". A higher number of the set of conduits 284 may be contemplated. Both the first conduit 284' and the second conduit 284" may be formed or disposed on the second portion 272 of the wall 264 of the housing 234 and may each independently extend through the thickness, T2, of the second portion 272 of the wall 264 such that each of first conduit 284' and the second conduit 284" may facilitate fluid communication between the chamber 258 and the environment external to the housing 234. Although not limited, the first conduit 284' and the second conduit 284" may be disposed diametrically oppositely to each other. Further, the first conduit 284' may define a first conduit axis 296 and the second conduit 284" may define a second conduit axis 300. In some embodiments, the first conduit axis 296 and the second conduit axis 300 may be co-axially aligned to each other or may be parallel to each other. Further, it may be noted that the set of ports 280 may be positioned towards (or relatively closer to) the primary axial end 250 of the housing 234 while the set of conduits 284 may be positioned towards (or relatively closer to) the secondary axial end 254 of the housing 234.

The plunger 238 may be disposed within the chamber 258 to slide or move (e.g., back and forth between the primary axial end 250 and the secondary axial end 254) within the chamber 258. In so doing, the plunger 238 may move or slide between an actuated state and a de-actuated state. The actuated state means a position attained by the plunger 238 when the plunger 238 is moved away from the first portion 268 of the wall 264, towards the secondary axial end 254 of the housing 234. In the actuated state, the plunger 238 opens the set of ports 280 and the set of conduits 284 to the chamber 258 (or to corresponding sections of the chamber 258). The de-actuated state means a position attained by the plunger 238 when the plunger 238 is moved all the way to abut or contact the first portion 268 of the wall 264 disposed at the primary axial end 250 of the housing 234. In the de-actuated state, the plunger 238 closes the set of ports 280 and the set of conduits 284 to the chamber 258.

In further detail, the plunger 238 may include a spool 304. The spool 304 may include a first piston portion 308 at a first axial end 312 of the spool 304, a second piston portion 316 at a second axial end 320 of the spool 304, and a stem portion 324 connecting the first piston portion 308 to the second piston portion 316. The first piston portion 308 and the second piston portion 316 may include similar or same diameters (or cross-sectional areas) and each of which may be equal to or slightly less than a diameter (or a cross-sectional area) defined by the chamber 258. In that manner, the plunger 238 may be accommodated within the chamber 258 so as to slide within the chamber 258 with a minimum clearance to the chamber 258. Further, the stem portion 324 may include a diameter (or a cross-sectional area) smaller than the diameters (or cross-sectional areas) of the first piston portion 308 and the second piston portion 316 such that an annular recess 328 may be defined around the stem portion 324.

Further, the first piston portion 308, the second piston portion 316, and the stem portion 324 may be integrally formed. Also, the first piston portion 308, the second piston portion 316, and the stem portion 324 may be defined co-axially with respect to each other. In that manner, the plunger 238 may define a plunger axis 332 passing through each of the first piston portion 308, the second piston portion 316, and the stem portion 324. When the plunger 238 is disposed or assembled into the chamber 258, the plunger axis 332 may fall in line or be co-axially aligned with the chamber axis 262. In so doing, a movement or the slide of the plunger 238 within the chamber 258 may be facilitated (e.g., in a back and forth pattern) along the chamber axis 262. Also, in some embodiments, the plunger axis 332 may be co-axially aligned or may be parallel to the first port axis 288.

It may be noted that in the de-actuated state of the plunger 238, the chamber 258 may be closed to the set of ports 280 and the set of conduits 284 by the first piston portion 308 and the second piston portion 316, respectively. Conversely, in the actuated state, the first piston portion 308 and the second piston portion 316 may clear and open the set of ports 280 and the set of conduits 284 to the chamber 258 (or to corresponding sections of the chamber 258), respectively.

The plug 246 may be coupled to the housing 234 at the secondary axial end 254 of the housing 234. As an example, the plug 246 may be inserted (e.g., by press-fitting) into the chamber 258 from the opening 276 formed at the secondary axial end 254. In this regard, the plug 246 may define a stub portion 336 that may interfere with the chamber 258 at the opening 276 of the chamber 258 defined at the secondary axial end 254 such that the interference may help attain an interference fit of the stub portion 336 (and thus the plug 246) with the opening 276 at the secondary axial end 254. In that manner, a coupling between the plug 246 and the housing 234 may be attained. Other manner coupling or connection, such as a threadable coupling of the plug 246 with the opening 276 of the chamber 258 may be contemplated.

The biasing member 242 may be seated between the plunger 238 and the plug 246. The biasing member 242 may bias the plunger 238 to the de-actuated state (or to a default state or a home state) when the plug 246 is coupled to the housing 234 at the secondary axial end 254 of the housing 234. In some embodiments, the biasing member 242 includes a spring 340.

The actuated state of the plunger 238 (see FIG. 5) may be attained when a lubricant supply enters into the chamber 258 through the first port 280 and a lubricant supply pressure of the lubricant supply impinges on the plunger 238 (or the first piston portion 308 of the plunger 238) and pushes and moves the plunger 238 against a force (e.g., a spring force) of the biasing member 242 such that the plunger 238 moves in a direction towards the secondary axial end 254 to the actuated state. In the actuated state, the plunger 238 may open the first port 280' and the second port 280" for communication with a section (e.g., a first section 344) of the chamber 258, and also may open the first conduit 284' and the second conduit 284" for fluid communication with another section (e.g., a second section 348) the chamber 258. In other words, in the actuated state, the plunger 238 may divide the chamber 258 into the first section 344 and the second section 348 (see FIG. 5), with the first section 344 being defined relatively closer to the primary axial end 250 of the housing 234 and the second section 348 being defined relatively closer to the secondary axial end 254 of the housing 234.

As may be visualized from FIG. 5, in the actuated state of the plunger 238, the first section 344 may be defined or delimited by the housing 234 and the first piston portion 308, or, in other words, by the first portion 268 of the wall 264, a region of the second portion 272 of the wall 264, and the first piston portion 308 of the plunger 238. In that manner, in the actuated state, the set of ports 280 (e.g., the first port 280' and the second port 280") may be fluidly coupled to each other through the first section 344 of the chamber 258 to define a first passageway 352 of the housing 234. Also, in the actuated state of the plunger 238, the second section 348 may be defined or delimited by the housing 234, the first piston portion 308, and the second piston portion 316, or, in other words, by another region of the second portion 272 of the wall 264, the first piston portion 308, and the second piston portion 316 of the plunger 238. In that manner, in the actuated state, the set of conduits 284 (e.g., the first conduit 284' and the second conduit 284") may be fluidly coupled to each other through the second section 348 of the chamber 258 to define a second passageway 356 of the housing 234. It may be noted that the second section 348 and the annular recess 328 may coincide with each other.

The de-actuated state of the plunger 238 (see FIG. 4) may be attained when the lubricant supply is halted through the first port 280' and the corresponding lubricant supply pressure is reduced. In so doing, the plunger 238 may return to the default state or the de-actuated state by having the biasing member 242 push the plunger 238 towards the primary axial end 250 of the housing 234 and, in turn, moving the plunger 238 all the way to abut or contact the first portion 268 of the wall 264 disposed at the primary axial end 250 of the housing 234. As shown in FIG. 4, in the de-actuated state of the plunger 238, the first piston portion 308 blocks the first passageway 352 and the second piston portion 316 blocks the second passageway 356.

INDUSTRIAL APPLICABILITY

A method for facilitating a lubricant transfer with respect to the first bearing system 172 of the hitch system 144 is discussed. During a lubricant transfer operation or a lubricant replenishment of the first bearing system 172, an operator may provide the valve 230 and may bring forth the valve 230 towards the hitch system 144 or the first bearing system 172 of the hitch system 144 and may fluidly couple the first passageway 352 to the lubricant supply line 198. Thereafter, the operator may also fluidly couple the second passageway 356 to the second gallery 158. Because the second gallery 158 facilitates a purging or a release of the lubricant (e.g., a used lubricant) from the hitch system 144 or the first bearing system 172 of the hitch system 144, the second gallery 158 may also be interchangeably referred to as a lubricant release line 162. In some embodiment, the fluid coupling between the first passageway 352 and the lubricant supply line 198 may be accomplished by way of a first hose 360 and the fluid coupling between the second passageway 356 and the lubricant release line 162 may be accomplished by way of a second hose 364. Other ways to achieve such fluid coupling may be contemplated by those with skill in the art. Also, at this point, the plunger 238 of the valve 230 may be in the de-actuated state.

Figure 3:
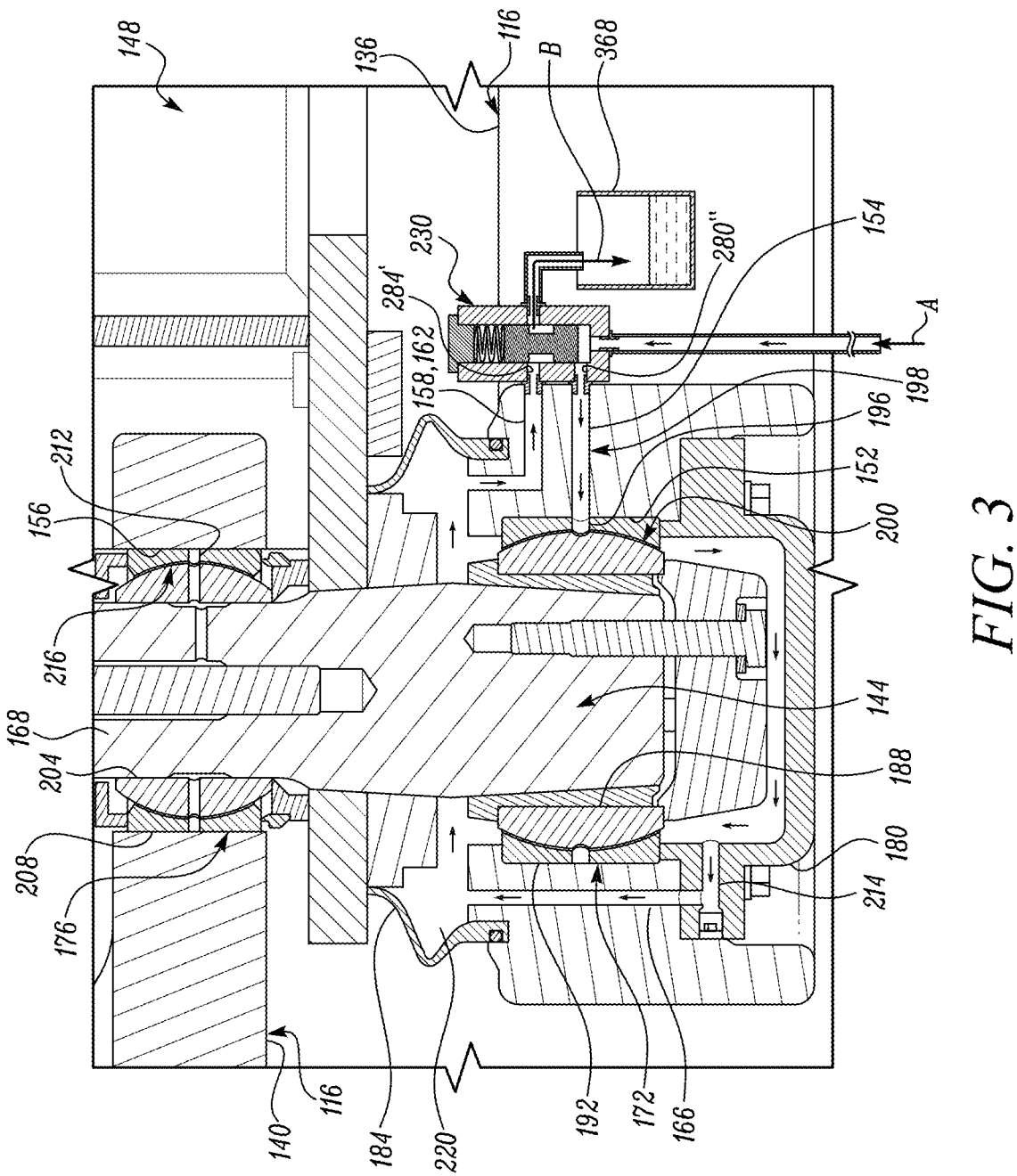
FIG. 3 is the enlarged view of the hitch system illustrated with the valve, in accordance with another embodiment of the present disclosure.

In some embodiments, and as shown in FIG. 3, the first hose 360 and the second hose 364 may be omitted. In such a case, the valve 230 or the housing 234 of the valve 230 may be brought closer to (e.g., to abut with) the forward frame portion 136 such that the first passageway 352 (or the second port 280" of the first passageway 352) may be directly and fluidly coupled with the lubricant supply line 198, e.g., by use of a suitable coupler. Similarly, the second passageway 356 (or the first conduit 284' of the second passageway 356) may be directly and fluidly coupled with the lubricant release line 162, e.g., by use of another suitable coupler.

Once the fluid coupling between the first passageway 352 and the lubricant supply line 198 and the fluid coupling between the second passageway 356 and the lubricant release line 162 is accomplished, the operator may initiate a supply of a lubricant (e.g., a new lubricant) (having a corresponding lubricant supply pressure) through the first passageway 352, e.g., sequentially through the first port 280', the first section 344 of the chamber 258, and the second port 280" (see direction, A, FIGS. 2, 3, and 5), such that the lubricant (e.g., the new lubricant) passes through the first passageway 352 and enters into the first interface 200 defined between the first inner race 188 and the first outer race 192 of the first bearing system 172.

More specifically, as the lubricant (e.g., new lubricant) enters into the first port 280', the lubricant supply pressure of the inflowing, new lubricant pushes against the plunger 238 or the first piston portion 308 of the plunger 238 such that the lubricant supply pressure overcomes the force of the biasing member 242 and causes the plunger 238 to move towards the secondary axial end 254 of the housing 234 (see direction, M, FIG. 4), thereby moving the plunger 238 to the actuated state from the de-actuated state. In process of the movement of the plunger 238 towards the secondary axial end 254 or to the actuated state, the plunger 238 opens the first section 344 of the chamber 258 to each of the first port 280' and the second port 280", thereby granting access to the inflowing, new lubricant and the associated lubricant supply pressure to be introduced into the first section 344 of the chamber 258 and the second port 280" of the first passageway 352. Also, in the actuated state, the plunger 238 opens both the first conduit 284' and the second conduit 284" to the chamber 258 (or to the second section 348 of the chamber 258), and thus also opens the second passageway 356.

A continued lubricant supply pressure may cause the lubricant (e.g., the new lubricant) to travel further through the first passageway 352 and exit the first passageway 352 through the second port 280". In that manner, the lubricant supply pressure is released out from the first section 344 of the chamber 258 and the lubricant (e.g., the new lubricant) is then delivered at or into the first interface 200. The lubricant (e.g., the new lubricant) then exits from the first interface 200 into the lubricant case 180 (e.g., under the action of gravity). At the same time, some volume of the lubricant (e.g., the new lubricant) may also exit through the first interface 200 into the internal seal chamber 220. Once the lubricant case 180 is filled with the lubricant (e.g., the new lubricant), a continued lubricant supply pressure may force the lubricant filled within the lubricant case 180 to further move or drain out into the duct 166 through the outlet 214 of the lubricant case 180, and then advance or progress further into the internal seal chamber 220 so as to appropriately fill the internal seal chamber 220.

As long as the lubricant pressure supply may be present or available, and which may be high enough to overcome the force (e.g., spring force) of the biasing member 242, the plunger 238 may remain in the actuated state. Once the internal seal chamber 220 is appropriately filled, the operator may stop the lubricant (e.g., new lubricant) supply, thus causing a drop in the lubricant supply pressure. The drop in the lubricant supply pressure may cause the force of the biasing member 242 to overcome the lubricant supply pressure and move or return the plunger 238 to the de-actuated state in which the plunger 238 blocks the first passageway 352 and the second passageway 356.

If an old or a used lubricant were housed within (or around) the first bearing system 172, an introduction of the lubricant (e.g., the new lubricant), in the manner as discussed above, may simultaneously or concomitantly pressurize and/or push the used lubricant out through the lubricant release line 162 with a relatively low back pressure. In such a case, because the plunger 238 is in the actuated state, the opened, second passageway 356 may provide an exit route for the used lubricant to be purged out from the lubricant release line 162 and thus out from the hitch system 144 or from the first bearing system 172 of the hitch system 144 (see direction, B, FIGS. 2, 3, and 5).

For example, in the actuated state, the used lubricant enters into the second section 348 of the chamber 258 through the first conduit 284', passes annularly around the stem portion 324, and exits out from the second section 348 of the chamber 258 (and the first bearing system 172) through the second conduit 284". Effectively, in the actuated state, the valve 230 facilitates an inflow of a lubricant (e.g., a new lubricant) into the first bearing system 172 of the hitch system 144 through the first passageway 352 to cause a concomitant purge and release of a lubricant (e.g., a used lubricant) from the first bearing system 172 of the hitch system 144 through the second passageway 356, in turn efficiently replenishing the lubricant in the first bearing system 172 of the hitch system 144.

With the use of the valve 230, a transfer of lubrication (i.e., both a supply of a new lubricant and a purge of a used lubricant) is efficiently and relatively easily attained. Further, because the used lubricant can be retrieved (e.g., with a low back pressure) by a use of the valve 230, the used lubricant may also be easily collected at an exit of the second passageway 356, e.g., into a container, such as container 368 (FIGS. 2 and 3), avoiding spillage and contamination of an outside environment. As may be understood from the description above, the valve 230 also eases and simplifies the transfer (and/or a replenishment) of the lubricant (e.g., the new lubricant) into sealed systems, such as the first bearing system 172 of the hitch system 144. A similar manner of lubricant replenishment or lubricant transfer operation may be contemplated for other sub-systems, such as the second bearing system 176, of the hitch system 144, and/or for various other systems of the machine 100 or for any machine.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

The invention claimed is:

1. A valve, comprising:
a housing defining a chamber, a set of ports, and a set of conduits; and
a plunger disposed within the chamber and configured to be moved to an actuated state in which the set of ports are fluidly coupled to each other through a first section of the chamber to define a first passageway and the set of conduits are fluidly coupled to each other through a second section of the chamber to define a second passageway,
wherein, in the actuated state, the valve facilitates an inflow of a new lubricant through the first passageway to cause a concomitant purge and release of a used lubricant through the second passageway
wherein the plunger is configured to be moved to a de-actuated state to block the first passageway and the second passageway in the de-actuated state.

2. The valve of claim 1, wherein the plunger is moved to the actuated state by a lubricant supply pressure of the new lubricant.

3. The valve of claim 2, wherein the plunger defines a plunger axis and the set of ports includes a first port to introduce the lubricant supply pressure into the first section of the chamber and a second port to release the lubricant supply pressure out from the first section of the chamber, the first port defining a first port axis, the first port axis being defined along or parallel to the plunger axis.

4. The valve of claim 1 further including a biasing member-to bias the plunger to the de-actuated state.

5. The valve of claim 4, wherein the chamber is open to an end-of the housing, the valve further includes a plug inserted into the chamber from the end, wherein the biasing member is seated between the plunger and the plug.

6. The valve of claim 4, wherein the biasing member includes a spring.

7. The valve of claim 1, wherein the plunger includes a spool with a first piston portion at a first axial end of the spool, a second piston portion at a second axial end-of the spool, and a stem portion connecting the first piston portion to the second piston portion.

8. The valve of claim 7, wherein,
in the actuated state of the plunger, the first section of the chamber is delimited by the housing and the first piston portion, and the second section of the chamber is delimited by the first piston portion, the second piston portion, and the housing, and
in the de-actuated state of the plunger, the first piston portion blocks the first passageway and the second piston portion blocks the second passageway.

9. The valve of claim 7, wherein the set of conduits include a first conduit and a second conduit, and in the actuated state, the used lubricant enters into the second section of the chamber through the first conduit, passes annularly around the stem portion, and exits out from the second section of the chamber through the second conduit.

* * * * *